Oct. 4, 1966 C. E. SCHON 3,276,454
CIGAR MACHINE FOR FORMING CIGAR WITH FILTER THEREIN
Original Filed July 3, 1961 6 Sheets-Sheet 1

INVENTOR
CHARLES E. SCHON
BY
ATTORNEY

Oct. 4, 1966 C. E. SCHON 3,276,454
CIGAR MACHINE FOR FORMING CIGAR WITH FILTER THEREIN
Original Filed July 3, 1961 6 Sheets-Sheet 2

INVENTOR
CHARLES E. SCHON
BY Bradley Cohn
ATTORNEY

Oct. 4, 1966 C. E. SCHON 3,276,454
CIGAR MACHINE FOR FORMING CIGAR WITH FILTER THEREIN
Original Filed July 3, 1961 6 Sheets-Sheet 3

INVENTOR
CHARLES E. SCHON
BY
ATTORNEY

Oct. 4, 1966 C. E. SCHON 3,276,454
CIGAR MACHINE FOR FORMING CIGAR WITH FILTER THEREIN
Original Filed July 3, 1961 6 Sheets-Sheet 4

INVENTOR
CHARLES E. SCHON
BY
ATTORNEY

Oct. 4, 1966     C. E. SCHON     3,276,454

CIGAR MACHINE FOR FORMING CIGAR WITH FILTER THEREIN

Original Filed July 3, 1961     6 Sheets-Sheet 5

INVENTOR
CHARLES E. SCHON
BY
ATTORNEY

Oct. 4, 1966 C. E. SCHON 3,276,454
CIGAR MACHINE FOR FORMING CIGAR WITH FILTER THEREIN
Original Filed July 3, 1961 6 Sheets-Sheet 6

INVENTOR
CHARLES E. SCHON
BY
ATTORNEY

United States Patent Office

3,276,454
Patented Oct. 4, 1966

3,276,454
CIGAR MACHINE FOR FORMING CIGAR WITH FILTER THEREIN
Charles E. Schon, West Hempstead, N.Y., assignor to American Machine & Foundry Company, a corporation of New Jersey
Original application July 3, 1961, Ser. No. 121,532, now Patent No. 3,165,106, dated Jan. 12, 1965. Divided and this application May 7, 1964, Ser. No. 365,695
3 Claims. (Cl. 131—29)

This application is a division of my application Serial No. 121,532 filed July 3, 1961, now U.S. Patent 3,165,106 issued on January 12, 1965, and claim is hereby made to all the equitable and legal rights incident thereto.

This invention is a machine for inserting a filter in a cigar bunch.

The use of filters in the smoking of tobacco in various forms has greatly increased in recent years, particularly in the smoking of cigarettes, and to a considerable extent in the smoking of pipes. There has recently been a large increase also in the use of cigar holders in cigar smoking. This increase is greatest in the use of cigar holders applied to the head end of cigars during their manufacture. Cigar holders afford cigar smokers some advantages, however, holders have not found wide acceptance with cigar smokers probably because it it considered that the advantages they afford are overbalanced by the penalties they impose. While many smokers are willing to sacrifice a certain amount of the enjoyment to be had in smoking tobacco by the use of such a device as a filter, they are reluctant to do so for the limited advantages afforded by a holder which has no filtering action. Perhaps the most important objection held by cigar smokers to the use of a cigar holder is that its use deprives the smoker of what many of them consider one of the most gratifying pleasures to be had in cigar smoking, namely savoring the flavor of the cigar tobacco in direct contact with the mouth.

A filter applied exteriorly to the end of a cigar also has the disadvantage that it deprives the smoker of the pleasure of tasting the tobaco directly.

In the present invention a filter is machine rolled interiorly into a cigar bunch in such a manner that it does not prevent the tobacco from coming into direct contact with the smoker's mouth.

Another object of the invention is an improved machine for making a cigar filter.

As is generally well known by those familiar with cigar manufacture, most cigars sold in this country comprise a cigar filler, either long or short, which is rolled with a binder into a generally cylindrical structure to constitute what is called a bunch. The bunch is then enveloped in an outer covering called a wrapper to complete the cigar. Most cigar smokers, particularly those who smoke the less expensive cigars having short filler are familiar with the condition wherein dampened particles or shreds of tobacco become detached progressively from the head end of the bunch weakening and deforming the cigar structure and interfering with its smoking qualities. This is one of the considerations recommending the use of a cigar holder nothwithstanding the disadvantage mentioned in the foregoing. In the present invention, in addition to providing a filter disposed in such manner that it does not interfere with the direct tasting of the tobacco by the smoker, the filter is built into the structure of the bunch in a manner to make it more rigid and to prevent its deformation after partial smoking by shedding particles of filler.

A feature of the invention is a filter enveloped in the cigar during the machine manufacture of the cigar.

Another feature of the invention is a machine for rolling a filter into the bunch.

Another feature of the invention is a machine for rolling a filter into a long filler bunch.

Another feature of the invention is a machine for rolling a filter into a short filler bunch.

Another feature of the invention is a machine for enveloping a filter within both a binder and a wrapper in a manner to prevent dislodgment of tobacco particles in the bunch while permitting direct contact of the tobacco with the mouth of the smoker.

Another feature of the invention is a tamper which squares up the end of the filler to prepare the bunch for the machine rolling of the filter therein with the bunch binder.

Another feature of the invention is the successive machine operations of impressing a pattern into the filter material to permit it to be thereafter loosely rolled into a filter, followed by the machine rolling of the patterned filter material with the filler within a wrapper to form a bunch.

Another feature of the invention is the machine rolling of the filter in a binder simultaneously with the filler.

Another feature of the invention is the simultaneous machine rolling of a filler with a filter in a long filler cigar, while coiling the convolutions of the filter from its longitudinal axis progressively outward toward its periphery.

Another feature of the invention is the simultaneous machine rolling of a filler with a filter in a short filler cigar while coiling the convolutions of the filter progressively inward from its periphery toward its longitudinal axis.

In order to afford the cigar smoker the satisfaction which he experiences in savoring the taste of the cigar tobacco in direct contact with his mouth, it is desirable that the filter be enveloped in several layers of tobacco.

Enclosure within the wrapper alone is inadequate. When the filter is first enveloped in the tobacco binder and then covered with the tobacco wrapper, particularly when the pitches of the helixes of the binder and wrapper are not excessively large, it is difficult for the average cigar smoker to detect the presence of the filter, and he experiences substantially all of the enjoyment of tasting and smoking a cigar which has no filter.

As is generally well known in the manufacture of cigars, the wrapper and the binder are generally selected from the more choice milder leaf which is relatively freer of filterable substances than the tobacco generally used as cigar fillers. With the filter disposed as herein, that is to say enclosed in the binder at the head end of the bunch, substantially all of the products of combustion produced by the filler and substantially all produced by the binder and wrapper will be entrained in the smoke which passes into the filter. In other words, a filter enclosed within a binder subjects substantially all of the combustion products produced in the burning of a cigar to filtering action as effectively as does a filter of the same material and size affixed to a cigar wrapper external to the end of the cigar.

In summation, therefore, a filter enveloped in a bunch does not interfere with the enjoyment of the direct taste of the tobacco. It is substantially as effective in its filtering action as a filter attached externally to the end of a cigar. It strengthens the structure so that the cigar does not become deformed during smoking and prevents random particles of the filler from passing into the smoker's mouth.

With respect to the strengthening of the cigar structure by machine rolling a filter into a cigar bunch, while some filters are better in this respect than others, all of them afford improvement over cigars constituted solely of a bunch and a wrapper. This improvement is marked when the bunch is formed of short filler.

With respect to the material of which the filter is formed, for the purpose of continuous uninterrupted machine manufacture, an absorbent, nontoxic, material which can be formed into a roll to serve as a continuous supply is preferable. Paper is a satisfactory material and among the cheapest. Various kinds of paper may be used, ordinary paper made from wood pulp is satisfactory as is crepe paper or blotting paper. Felted or matted cotton fibers, wool fibers, vegetable fibers, glass wool, filaments or fibers of textiles such as rayons, nylons, vinyls also may be used.

Dried fluffed absorbent cellulosic material treated as necessary to form a filter material is satisfactory. Viscose material such as viscose sponge, cellophane and crinkled cellophane are effective because of their adsorbent quality. Activated charcoal grains glued or secured by rubber, or rubber latex, or otherwise secured, to a backing, such as a thin sheet of cellophane which may be coiled into a filter, is effective also because of its adsorbent quality. Silica gel and activated alumina may be similarly treated to form a satisfactory filter. In short all effective tobacco filtering agents, particularly those which may be formed into a continuous self-supporting strip, or which may be formed with an adhesive material and a backing into a strip capable of simultaneous rolling with a tobacco binder into a cigar bunch, may be employed as a filter herein.

The invention may be understood from the following description when read with reference to the associated drawings herein, which taken together disclose preferred embodiments in which the invention is presently incorporated. It is to be understood however that the invention is not limited to incorporation in the disclosed embodiments but may be practiced in other embodiments which will be readily suggested to those skilled in the art from a consideration of the following.

The invention relates to the machine manufacture of cigars and particularly to a cigar filter which may be rolled into the head end of the cigar during bunch forming operation. Since the method and apparatus for rolling a long filler bunch differ somewhat from that for rolling a short filler bunch, the method of inclusion of a filter in the head ends of the two types of cigar bunches may also differ.

FIGS. 1, 2, 3, 4 and 5 illustrate the rolling of a filter into the head end of a long filler cigar bunch. FIGS. 8, 9, 10, 11 and 12 illustrate the rolling of a filter into the head end of a short filler bunch.

The rolling of a long filler cigar bunch is accomplished in the conventional manner by means of a rolling apron 20 and a rolling pin 22 working in conjunction with a rolling table 24 and a rider plate 26 in substantially the same manner as shown and described in Letters Patent 2,343,902 issued on March 14, 1944 to J. F. Halstead. The rolling apron 20, rolling pin 22, rolling table 24 and rider plate 26 illustrated in FIGS. 1, 2, 3, 4 and 5 are of identical design and construction as the same components shown and described in the above mentioned patent and therefore detailed description of the same is not deemed necessary.

Figure 2:
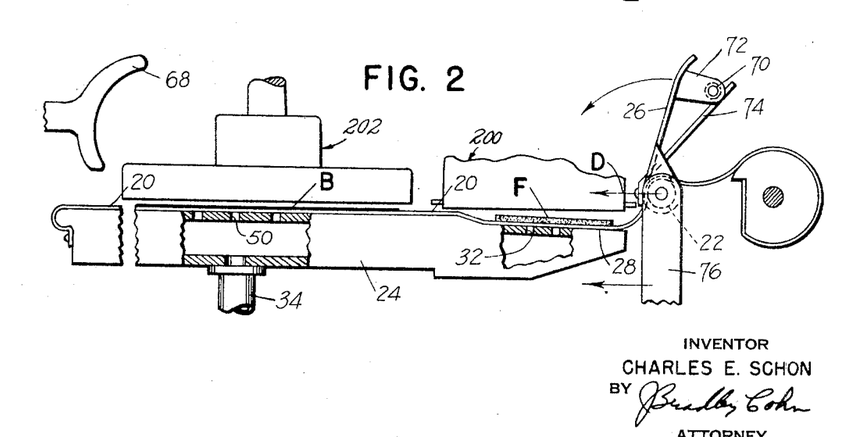
FIGS. 2, 3, 4 and 5 are side elevations of a bunch rolling table for a long filler cigar machine illustrating the successive steps of rolling long filler tobacco together with a blanket web of filter material into a binder during bunch forming operation by the rolling apron.

A thin flat charge of tobacco filler C is placed by a suitable charge transfer and delivery device 200 (FIG. 2) onto that portion of the rolling apron 20 which covers the depressed end 28 of the rolling table 24 when the rolling pin 22 is in its backmost position and the rider plate 26 which is pivotally carried by the latter is in upright position as illustrated in FIG. 2. As soon as the charge of tobacco filler C is deposited on the apron, a strip of filter material F is placed in area H, adjacent to that end of the filler charge C which will form the head end of the cigar. This operation is performed by means of an oscillating transfer T, which may be, for instance such as shown and described in patent application Serial No. 756,793 filed by Sigurd Clausen on August 25, 1958. In order to firmly hold the filter strip F on the rolling apron 20 after being deposited thereon, the apron has therein a suitable pattern of apertures 30 which register with apertures 32 in the depressed end of the hollow rolling table 24. The hollow table is connected through tube 34 to a suitable source of suction (not shown).

Figure 1:
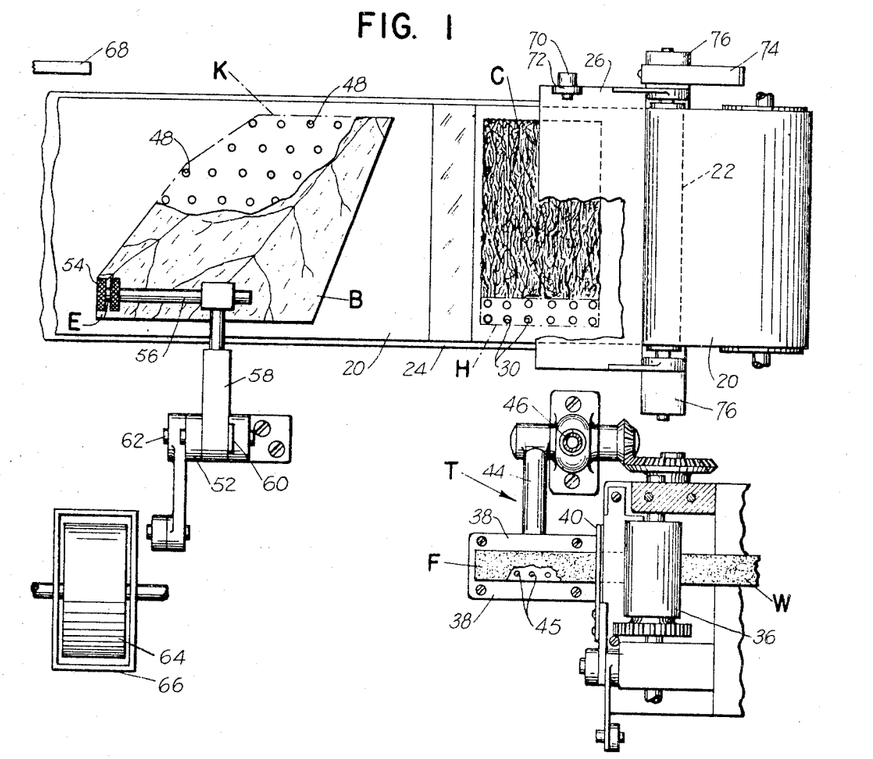
FIG. 1 is a plan view of a cigar bunch rolling table for a long filler cigar machine illustrated in conjuction with a binder paste applying device and a filter web feeding and transfer mechanism.
Figure 10:
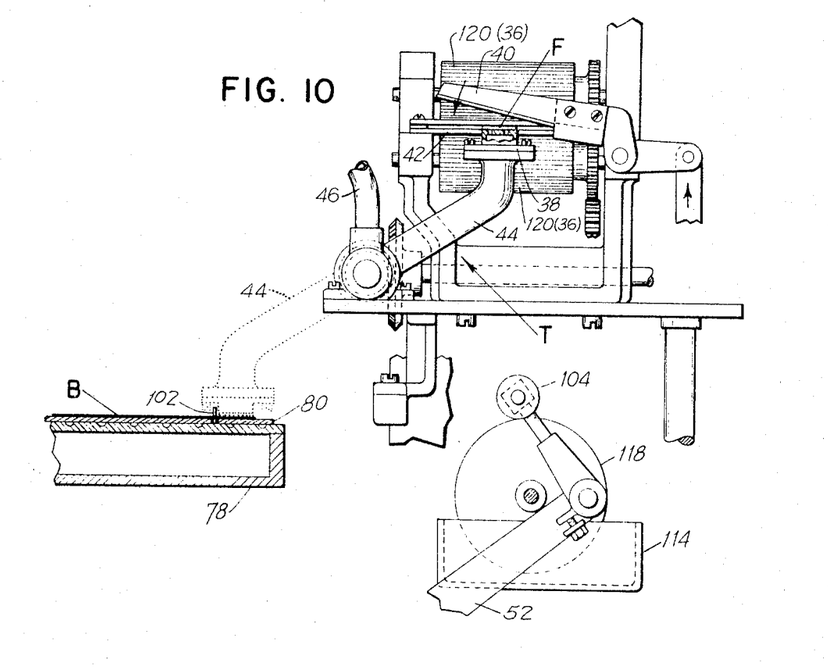
FIG. 10 is a sectional end elevation taken on line 10—10 of FIG. 8 illustrating a portion of the bunch rolling table in conjunction with the filter material feed and transfer mechanism as well as the paste applying device.

The filter material in the form of a web W is pulled from a source thereof mounted on a suitable reel, not shown, by a pair of intermittently rotating feed rollers, such as roller 36 (FIG. 1). Roller 36 coacts with another, not shown, underlying roller 36. This mechanism for feeding the filter material herein may be the same as shown and described in the above mentioned application, Serial No. 756,793 for feeding a reinforcing strip to the binder of a cigar bunch. The leading end of the filter material web W is fed onto a hollow transfer platform 38 of the transfer T, shown at the lower right in FIG. 1, and a filter strip F of predetermined length is cut from the web W by means of an oscillating knife blade 40 coacting with a fixed ledger plate 42 (FIG. 10). The knife 40 is actuated and the hollow transfer platform 38, secured to the free end of a hollow arm 44, is oscillated both in proper timed relation with the coacting components of the machine, all as fully disclosed in the aforementioned application Serial No. 756,793. The hollow platform 38 is provided with suitable apertures 45, FIG. 1, over which the leading end of the filter web is drawn. These apertures communicate through a hollow arm 44, a hollow bearing and a hollow air tube 46 to a source of properly timed suction (not shown). The suction is applied as soon as the predetermined length of filter strip F is fed onto platform 38 so that it is firmly held thereon during the cutting operation. After strip F is severed, arm 44 rotates through 180 degrees, to a position overlying area H of rolling apron 20 (FIG. 1). Suction is thereupon transferred from the platform 38 to the area H and transfer of the strip F from the transfer T to table 24 is thereby effected. Arm 44 is then rotated 180 degrees in a counter direction, returning platform 38 to its starting position.

While the feeding, severing and transfer operations on the filter strip have been proceeding, a suitably shaped binder B is deposited, by means of a binder transfer 202 (FIG. 2), well known in the art, on area K of rolling apron 20. Area K is also provided with a pattern of apertures. These apertures, such as aperture 48, register with apertures in the top of table 24 and communicate through a hollow chamber to a source of suction (not shown) properly timed to coordinate with the process. With the binder B in position on the apron 20, paste is applied to a small rectangular area of the binder by roller 54, so as to permit sealing of the bunch after the rolling operation. The roller 54 is loosely mounted on a shaft 56 which is adjustably held by a supporting member 58 loosely mounted on a stud 60. The stud is carried on the free end of oscillating arm 52, which is mounted on an oscillating shaft 62 actuated through another suitable arm and linkage, by means of a cam operated driving mechanism (not shown). A continuously rotating wheel 64 partly submerged in a paste pot 66 supplies the paste applying roller 54 with a desirable amount of paste in the same manner as shown and described in Letters Patent 2,391,294 issued on Dec. 18, 1945 to S. Clausen. After the operations described in the foregoing have been completed, rolling pin 22 starts to move from right to left, as indicated by the arrow D in FIG. 2. This movement loosens that portion of the apron 20 which is draped over the rolling pin and thus permits the rider plate 26 to fall by gravity into a position overlying both the filler C and the filter strip F. These and their supporting area of the rolling apron overlie a depressed portion 28 of rolling table 24. Since the detailed construction and function of the rider plate and rolling pin are fully disclosed and illustrated in Letters Patent 2,343,902, further description thereof is not deemed necessary.

Figure 3:
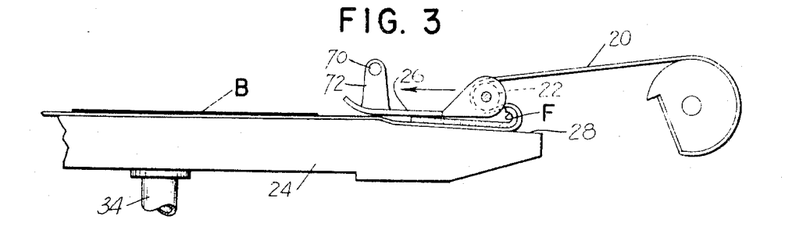
Figure 4:
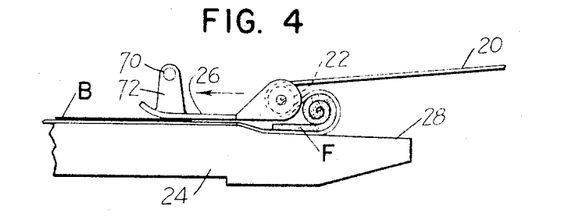
Figure 5:
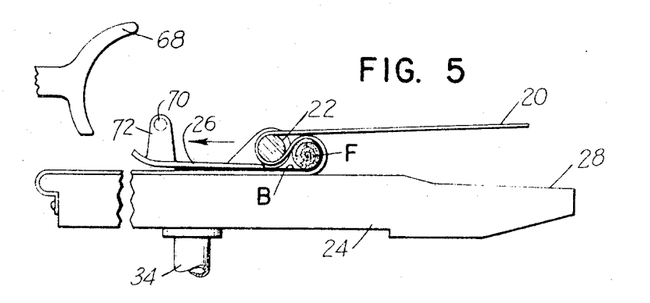
Figure 6:
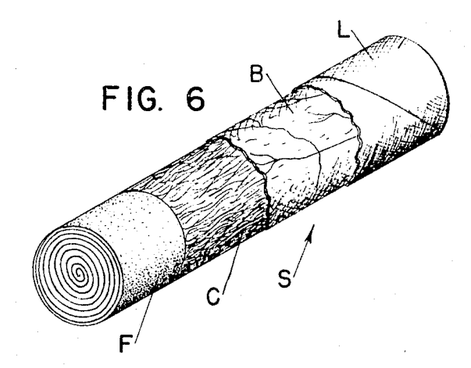
FIG. 6 is an isometric illustration of the head end of a blunt end cigar bunch with the binder broken away to show the rolled up filter blanket at the head end of the bunch.

The further advance of the rolling pin 22, to a position shown in FIG. 3 of the drawings, causes the forward end of the flat filler C and the filter strip F to be rolled by the loop of the apron 20. The loop of the apron first rolls up both the filler C and filter strip F from their right-hand edges, FIG. 2, while the unrolled portions of both are held flat against the underlying portion of apron 20 by rider plate 26. Thus, as the rolling pin 22 advances toward a position shown in FIG. 4, the filler and the filter strip are coiled in helical convolutions, each one upon itself, in the manner in which a carpet is rolled. This produces an approximate cylinder comprising a coiled bunch with a coiled filter at its head end. In the position shown in FIG. 4, as the loop in apron 20 nears the left-hand end of the inclined portion 20 of the table, the coiling of the filler and of the filter strip in the loop nears completion and just before the loop attains the horizontal surface of the table 24, coiling is completed. During the traverse of the horizontal surface by the loop, the apron is adjusted to reduce the diameter of the loop and to thereby constrict the coiled bunch and filter to the exact diameter desired. Since the means by which this is performed are shown and fully described in the aforementioned Halstead Patent 2,343,902, further description thereof is not deemed necessary. Upon further movement of the apron loop, carrying the rolled filler and filter strip over the horizontal portion of the rolling table 24, the binder leaf B, previously placed on the apron and held in position by suction as described, is wound about the rolled filler and filter strip as illustrated in FIG. 5. The rolling operation described produces a cigar bunch S of the desired size having a long tobacco filler C and a filter F at its head end as illustrated in FIG. 6.

Figure 7:
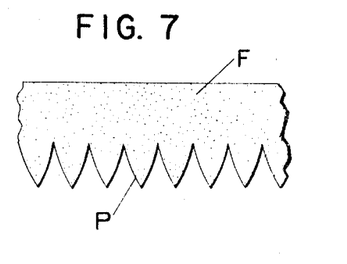
FIG. 7 is a plan view of a portion of a corrugated filter material web for forming a cigar bunch requiring a tapered head.

If a cigar having a tapered rather than a blunt head end is desired, the head end of the filter may be scalloped as illustrated at P in FIG. 7. As part of the process of producing a cigar having a tapered head end, the cigar is subjected to a crimping operation. The scalloping of the head end of the filter avoids excess compression which would otherwise be required. This would tend to distort the shape of the cigar and restrict the flow of smoke therethrough.

The rider plate 26 in approaching the rear end of the rolling table 24 is lifted from the apron 20 by means of a cam shaped lug 68 which projects in the path of and engages a stud 70 projecting from a bracket 72 secured to and integral with the rider plate 26. The engagement of stud 70 with the cam shaped lug 68 causes a gradual rotation of the free end of the advancing rider plate 26 about the shaft on which roller 22 is mounted. The rotation continues until stud 70 engages stop member 74. The latter is secured to and carried by one of the bearing lugs of the fork-shaped rolling pin supporting bracket 76 (FIG. 2). The engagement of stud 70 and member 74 sustains rider plate 26, in a position slightly clockwise of the vertical. The completed bunch drops from the left-hand end of the rolling table 24 into a suitable transfer device (not shown). Then the rolling pin 22 together with the substantially upright rider plate 26 return to their initial starting positions as shown in FIG. 2, to await the start of the next cycle of operations.

The rolling of a cigar bunch comprising a filter strip in combination with a charge of short filler tobacco necessitates other mechanisms, in addition to that described in the foregoing, to avoid hollow or uneven spots which may impair the quality of the bunch. This will now be described with reference to FIGS. 8 through 14.

Figure 8:
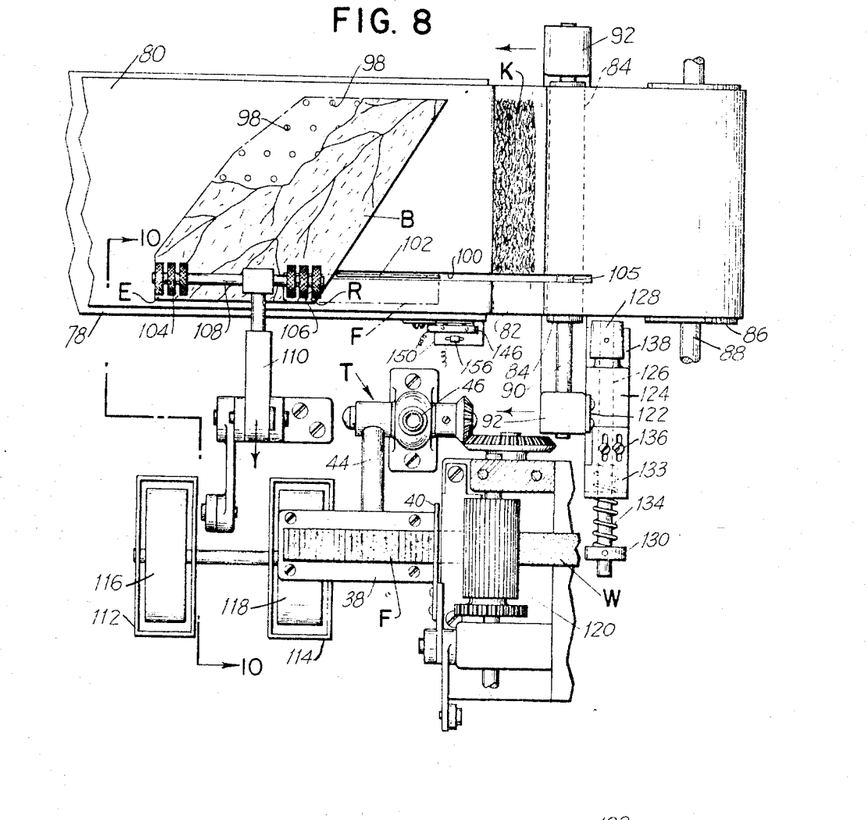
FIG. 8 is a plan view of a bunch rolling table for a short filler cigar machine shown in conjunction with a paste applying device and filter web feeding and transfer mechanism.
Figure 9:
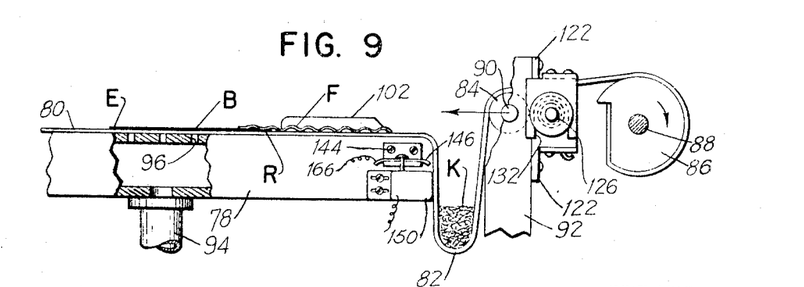
FIG. 9 is a side elevation, partly in section, of a bunch rolling table for a short filler cigar machine.

The forming of a standard short filler cigar bunch is accomplished preferably by a conventional rolling apron which is manipulated by a rolling pin over a suction supplied hollow rolling table. As illustrated in FIGS. 8 and 9, the hollow rolling table 78 supports the rolling apron 80 which forms a hanging loop or pocket 82 over the right-hand end of the table when the rolling pin 84 is in its backward or starting position. The front end of the apron 80 is secured in the conventional manner to the front end of the rolling table 78 and its other end is attached to an apron take-up roller 86 which is mounted on a horizontal shaft 88, and actuated through a suitable sprocket and chain arrangement (not shown) in the same manner as disclosed in the Halstead Patent 2,343,902. The rolling pin 84 is mounted on a horizontal shaft 90 rotatably supported in suitable bearings of a U-shaped rolling pin supporting bracket 92 secured to a suitable reciprocating carriage or slide (not shown) to effect the advance and return of the rolling pin 84 over the rolling table 78. The hollow rolling table 78 receives suction through a tube 94 from a suitable source (not shown) and its top face is provided with a pattern of suitable apertures 96 (FIG. 9) which register with corresponding apertures 98 in the apron 8 (FIG. 8). Apron 80 supports the binder leaf B after it is deposited thereon by a suitable binder transfer (not shown). Integral with the top face of the rolling table 78 and projecting upward through a longitudinal slot 100 in apron 80 is a narrow filler retaining plate 102. This plate is provided to prevent random particles of short filler from trickling onto the filter strip during bunch rolling operation.

Figure 13:
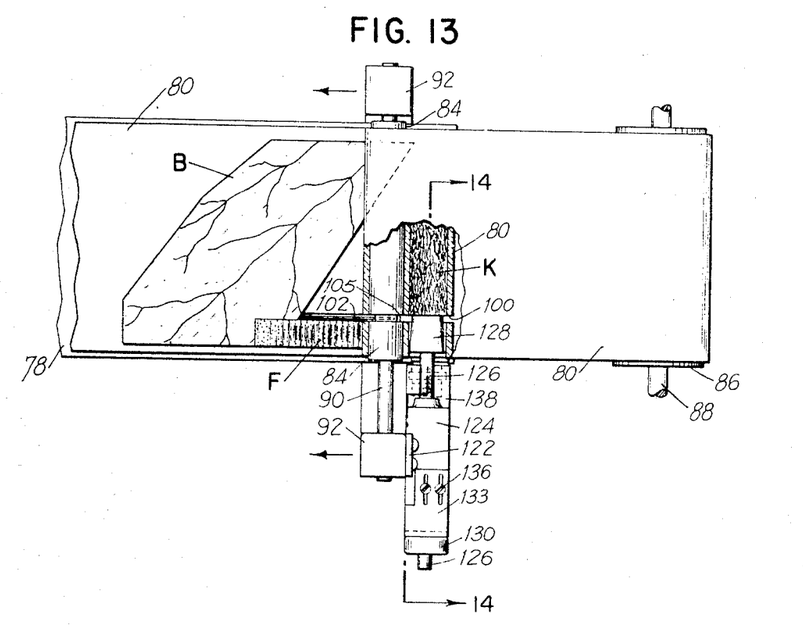
FIG. 13 is a plan view partly in section of a short filler cigar machine bunch rolling table illustrating the action of an automatic tobacco filler aligning device during bunch forming operation.

When the rolling pin 84 is in its extreme right-hand position, as shown in FIGS. 8 and 9, a predetermined charge of short filler tobacco K is deposited in the pocket 82 of the apron 80 by means of a conventional charge transfer, well known in the art. At the same time a suitably shaped binder leaf B is placed on a portion of the apron 80 overlying the horizontal surface of the rolling table 78. After the binder B is placed on the apron 80 two sets of spaced paste applying rollers 104 and 106 which are pivotally mounted on a shaft 108 and carried by an arm 110 are activated towards the rolling table 78 (FIG. 8). Rollers 104 and 106 engage the left-hand edge E and the right-hand edge R respectively of the head end portion of the binder leaf B and each applies paste to an individual rectangular area of the leaf. The paste applying rollers 104 and 106 are then withdrawn and the filter strip transfer platform 38, on the free end of arm 44 of the filter strip transfer mechanism T, carrying a filter strip F, cut to a predetermined length, affixes the left-hand portion of the filter strip to the right-hand front portion of binder leaf B, as shown in FIG. 8. The right-hand portion of filter strip F projects to the right of the binder leaf, and lies adjacent, parallel to, and in front of filler retaining plate 102, as illustrated in FIGS. 8 and 13. Since the two sets of paste applying rollers 104 and 106 are spaced apart, as shown in FIG. 8, it is desirable to have two separate paste pots 112 and 114, respectively, each one having a partly submerged continuously rotating wheel 116 and 118 which supplies the rollers 104 and 106, respectively, with the desired amount of paste. The paste applying actuating mechanism (not shown) is substantially the same as shown and described in Patent 2,391,294. The filter strip transfer and applicator T, illustrated in FIGS. 8 and 10, is the same as used in forming the long filler filter tip bunch, described in the foregoing and substantially the same as shown and described in patent application Serial No. 756,793 mentioned heretofore. One added feature in the presently described applicator is a pair of coacting fluted or grooved feed rollers 120, see FIG. 10. These coacting feed rollers impress corrugations into the filter strip. In this case the first convolution of the corrugated filter which is formed in the apron loop first lies along the outer periphery of the loop and as rolling proceeds, its leading end is coiled inwardly towards the longitudinal axis of the bunch, as may be understood from a consideration of FIGS. 9, 11 and 12. It will be recalled that, in the rolling of the long filler bunch, it was explained that the rolling resembled the rolling of a carpet, that is radially from the longitudinal axis toward the outer periphery. This is because the leading edge of the thin flat wad of filler and the leading edge of the filter strip are directed first into a small loop in the apron to form from the first convolution the center of the tobacco bunch charge and of the filter. As the rolling continues the outer convolutions are formed around this center. In the present case however, the entire short filler tobacco charge K is deposited in the relatively large apron pocket 82 before rolling starts, and the first convolution of the filter is directed against the inner surface of the enlarged loop and as rolling progresses is coiled radially inwardly therefrom. The first convolution becomes progressively smaller until the rolling is finished when it then becomes the center of the rolled filter. The corrugations or flutings permit the convolutions to interleave or fold upon themselves as the rolling of the filter progresses to fill the head end of the bunch. The filter strip F in this case is also fed intermittently from a web W by means of feed rollers 120 onto the hollow transfer platform 38 carried by the oscillating hollow arm 44. Suction is applied to the platform through the hollow arm after the leading end has been fed onto the platform. The desired length of filter strip is then cut off by means of the oscillating knife blade 40 as in the case of the long filler filter. The dotted position of arm 44 in FIG. 10 illustrates how the filter strip is placed adjacent the front side edge of the filler retaining plate 102.

Figure 14:
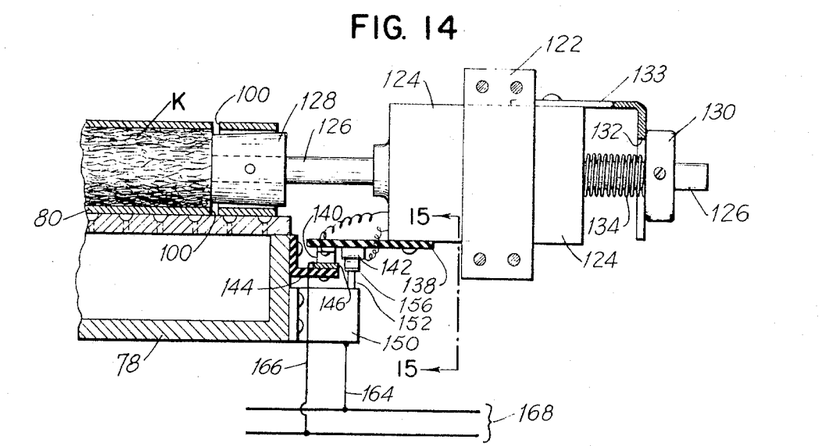
FIG. 14 is a fragmentary sectional end elevation of the bunch rolling table taken on line 14—14 of FIG. 13, illustrating the short filler tobacco aligning device on an enlarged scale.
Figure 15:
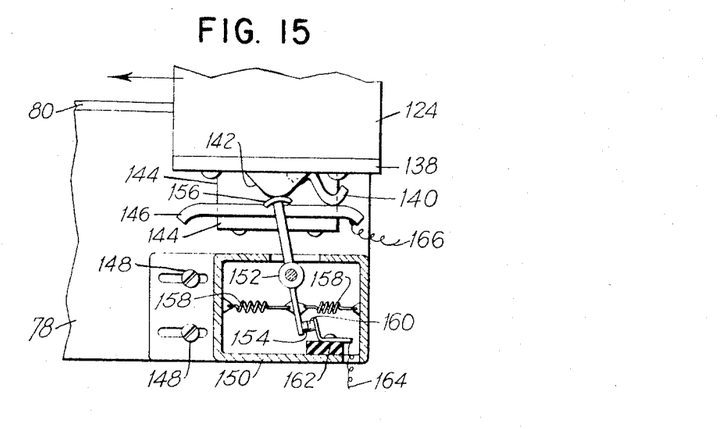
FIG. 15 is a detailed side elevation of the electrical control of the tobacco filler aligning device, taken on line 15—15 of FIG. 14.

A horizontal solenoid 124 is secured to one of the legs of the U-shaped rolling pin supporting member 92 by means of a bracket 122, FIGS. 8, 9, 13 and 14. The solenoid has an armature 126 which projects from both ends of the solenoid. As may be seen in FIGS. 8 and 9 the solenoid is disposed to the right of rolling pin 84 and vertical and horizontal planes through the longitudinal axis of the rolling pin and solenoid are parallel. A tamper 128, slightly tapered towards its end adjacent table 78, is secured to the end of armature 126 adjacent the table. A collar 130 is adjustable fastened to the opposite end of the armature which protrudes through an inverted U-shaped slot 132 of a bracket 133. A compression spring 134, is employed for the purpose of retracting the armature 126 and tamper 128 quickly when the solenoid is de-energized. A plate 138 (FIG. 14), formed of insulating material is secured to the bottom side of the solenoid. The plate 138 extends toward the rolling table 78 and carries on its bottom side a spring contact shoe 140 (FIGS. 14 and 15) and a contact lug 142 both of which are properly wired to the coil of the solenoid 124. A horizontal contact bar 146, similar to a third rail, is secured to the front side of the rolling table 78, by means of an insulated bracket 144. Contact shoe 140, as will be explained more fully hereinafter, engages contact bar 146, as the shoe is reciprocated with the rolling pin assembly. A suitable box 150 in which a contact arm 152 is pivotally supported is adjustably secured by means of screws 148 below bracket 144 on the front side of rolling table 78 (FIG. 15). Contact arm 152 carries a contact point 154 at its lower end. The upper end of the arm projects through a suitable slot in the top of box 150 and carries an arcuate wiper plate 156. Each of a pair of equalizer springs 158 has an outer end anchored to an individual opposed side in box 150 and an inner end connected to the lower portion of arm 152 to maintain the arm normally in an upright neutral position. Within box 150, in line with contact point 154 or arm 152, another contact point 160 is secured to a block 162 (FIG. 15), formed of insulating material. Contact point 160 and contact rail 146 are connected by means of conductors 164 and 166 respectively, to a suitable power line 168 (FIG. 14).

Figure 11:
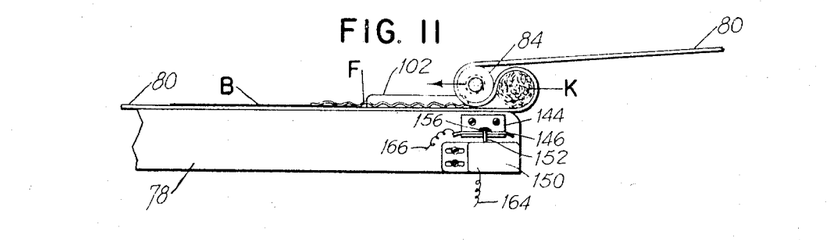
FIGS. 11 and 12 are fragmentary side elevations of the bunch rolling table of a short filler cigar machine illustrating how the filter strip is rolled into the head end of a short filler bunch during bunch forming operation.
Figure 12:
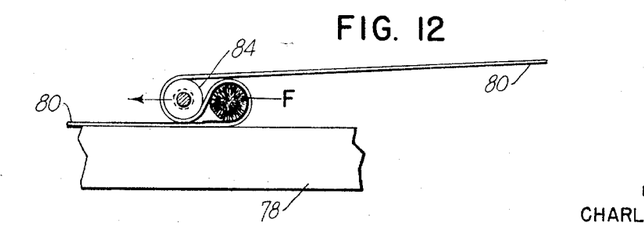

The short filler tobacco charge is deposited in the pocket 82 of the rolling apron 80. The binder leaf B is placed on the apron and the filter strip is placed in position on the binder as described in the foregoing. Then rolling pin 84 is actuated to the left (FIG. 8). When the rolling pin passes over the right-hand edge of the rolling table 78, in coaction with the apron takeup roller 86, it forms an approximate hollow cylinder in the apron transverse of table 78. The short filler tobacco charge is enclosed in this hollow cylinder as illustrated in FIG. 11. In order to free the near end portion of the cylinder, into which the filter strip will be rolled, from any random particles of tobacco which may be lodged there and to pack the near end of the tobacco charge so as to later form a firm square lateral abutment with the filter, the tapered tamper 128 is projected into the cylinder end briefly by the solenoid 124, just before the filter strip is rolled into the open end of the apron cylinder, as illustrated in FIGS. 13 and 14. The momentary thrust of the tamper 128 into the end of the loop consolidates the tobacco at the near end of the short filler charge, and at the same time clears it of any loose random particles of tobacco. As described heretofore, the plunger assembly is carried by the rolling pin supporting member 92, during the forward travel of the rolling pin in the bunch forming operation. The tamper 128 is withdrawn as the rolled charge K reaches the tobacco filler retaining plate 102. Precisely at this point, the rolling of the filter strip into the filter compartment starts. This reduces the chance that stray tobaco fragments may fall into the filter compartment. Since, as described above, the left-hand end of the filter strip, as seen in FIG. 13, is tacked or pasted to the right-hand end of the binder B, the right-hand portion of the filter strip is first rolled into the head end of the bunch, and then, as the rolling of the binder and the filter strip continues, the strip is enveloped by the binder. During the last stage of the rolling, the filter strip is rolled onto the pasted area E (FIG. 8) at the left-hand end of the binder to seal the bunch and to form a rigid structure.

To return now to the description of the operation of the tamper mechanism, the momentary thrust of the plunger 128 into the filter compartment of the apron is effected by means of the solenoid 124. The solenoid is momentarily energized during the forward travel of the rolling pin supporting member 92. As may be understood from reference to FIG. 15, the spring contact shoe 140 slides over the rail 146 and the contact lug 142 engages the wiper plate 156 on contact arm 152. This causes the arm to swing in an anticlockwise direction and effects a closing of contacts 154 and 160. Upon continued forward travel of member 92, as soon as lug 142 disengages from the wiper plate 156 of arm 152, the equalizer springs 158 return arm 152 to its normal upright position and thus effect an opening of contacts 154 and 160 and consequently a de-energization of the solenoid 124. Upon de-energization of the solenoid 124, the compression spring 134 (FIG. 14), retracts the plunger 128 from the filter compartment. At the end of the rolling operation the return travel of the rolling pin supporting member 92 tilts the contact arm 152 in a clockwise direction and contacts 154 and 160 remain open and the solenoid remains de-energized until the next bunch rolling cycle of the machine. In order to permit unhindered passage of the rolling pin 84 over the upward projecting tobacco retaining plate 102 on rolling table 78, the rolling pin 84 is provided with an annular groove 105, as shown in FIGS. 8 and 13.

Figure 16:
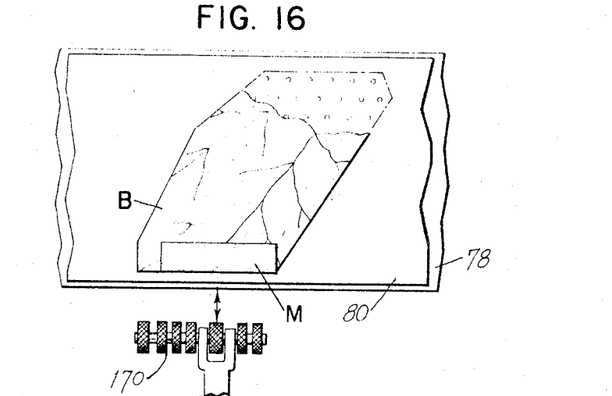
FIG. 16 is a fragmentary plan view of a bunch rolling table illustrating the placement of a modified filter strip blanket on a cigar binder prior to bunch rolling operation.
Figure 17:
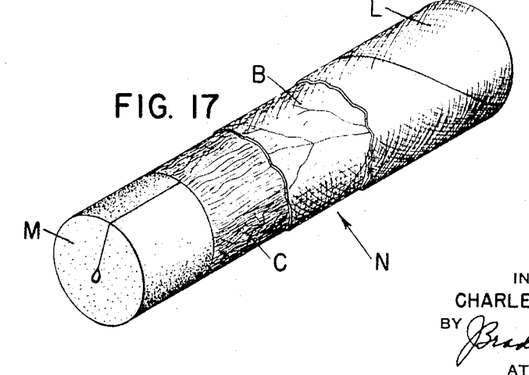
FIG. 17 is an isometric view of the head end of a cigar with the binder and wrapper broken away to illustrate the modified filter strip blanket after being rolled into the head end of the bunch in the bunch forming operation.

The invention contemplates also a so-called blanket filter constituted of any suitable tobacco smoke permeable substance M, so formed, FIG. 16, that, after rolling, it forms substantially a right cylinder as shown in FIG. 17. In this embodiment of the invention, the binder leaf B is first placed on the rolling apron 80 of the rolling table 78. Then a paster 170, having a sufficient number of pasting rollers to substantially cover the portion of the surface of the binder which will underlie the filter substance M, applies paste thereto. The filter may be rolled into the bunch substantially in the same manner as described for the other embodiments.

FIG. 17 illustrates a portion of a cigar bunch N in which a blanket type filter strip M has been rolled into its head end with the filler C abutting the filter and enveloped in a binder leaf B which, as exemplified in FIG. 17, has been broken away for clarity.

In the embodiment shown in FIGS. 16 and 17, the wad or blanket of smoke permeable material which filters the entrained solids, is pre-formed so that its abutting surfaces engage in a plane extending from the cylindrical surface of the filter along a radius to a longitudinal axial aperature of small radius. The preforming of the blanket includes provision to permit the formation of the small axial aperture during the rolling together of the blanket, the tobacco binder and the filler into the cigar bunch.

The application of the wrapper to the binder may be performed in the conventional manner in another cigar machine rolling operation as is well understood in the art. The superimposed wrapper which envelopes the whole bunch including the filter is represented by L in FIG. 6, and FIG. 17.

What is claimed is:

1. A cigar machine, comprising a continuous source of supply of filter strip, means for severing a predetermined length of said filter strip, said machine having a cigar bunch rolling table and means for supplying tobacco binder and tobacco filler separately to said table, means in said machine, responsive to said severing, for transferring said severed filter strip to said rolling table adjacent an end of said tobacco filler, and means in said machine, responsive to said transfer, for simultaneously rolling said filter strip, said filler and said binder into a cigar bunch, in which said filter strip is convoluted within said binder at the end of said tobacco filler.

2. A cigar machine comprising a rolling table having first and second receiving stations, a source of cigar binder and a source of cigar filler tobacco, means for transferring a cigar binder to said first receiving station, means for transferring a quantity of filler tobacco to said second receiving station, a source of continuous length filter strip, means for severing and transferring a predetermined length of said strip to a position adjacent an end of the filler at said second station, and means for causing the simultaneous rolling of said filler and filter strip within said binder in the direction of the length of said strip whereby to form a cigar bunch having a convoluted filter strip at one end of a roller filler.

3. A cigar machine comprising a rolling table having first and second receiving stations, a source of cigar binder and a source of long filler tobacco, means for transferring a cigar binder to said first receiving station and means for transferring a quantity of said filler tobacco to said second station as an elongated relatively loose pile, a source of continuous length substantially thin filter material, means for severing and transferring a predetermined length of said filter material to a position adjacent said filler tobacco so that the long dimension of one is at right angles to the long dimension of the other, means for rolling in the direction of the long dimension of said filter at said first station for convoluting said filler and said filter into at least a partial cylindrical form and for thereafter causing at said second station the completion and compaction of said filler and filter and for enveloping both in said binder to form a cigar bunch.

References Cited by the Examiner

UNITED STATES PATENTS

| 451,178 | 4/1891 | Martin | 131—29 |
|---|---|---|---|
| 2,167,170 | 7/1939 | Burns | 131—10 |
| 2,178,820 | 11/1939 | Todoroff | 131—10 X |
| 2,219,491 | 10/1940 | Podmore. | |
| 3,036,579 | 5/1962 | Godfrey | 131—29 |

FOREIGN PATENTS

| 212,202 | 12/1960 | Austria. |
|---|---|---|
| 523,861 | 4/1921 | France. |
| 532,157 | 11/1921 | France. |
| 1,229,423 | 3/1960 | France. |
| 1,230,318 | 3/1960 | France. |
| 116 | 1877 | Great Britain. |
| 13,394 | 1897 | Great Britain. |

SAMUEL KOREN, *Primary Examiner.*

H. P. DEELEY, JR., *Assistant Examiner.*